US010451431B2

(12) United States Patent
Masuko

(10) Patent No.: US 10,451,431 B2
(45) Date of Patent: Oct. 22, 2019

(54) ROUTE SEARCH SYSTEM, ROUTE SEARCH DEVICE, ROUTE SEARCH METHOD, PROGRAM, AND INFORMATION STORAGE MEDIUM

(71) Applicant: Rakuten, Inc., Tokyo (JP)

(72) Inventor: Soh Masuko, Tokyo (JP)

(73) Assignee: Rakuten, Inc., Tokyo (JP)

( * ) Notice: Subject to any disclaimer, the term of this patent is extended or adjusted under 35 U.S.C. 154(b) by 234 days.

(21) Appl. No.: 15/321,193

(22) PCT Filed: Feb. 27, 2015

(86) PCT No.: PCT/JP2015/055955
§ 371 (c)(1),
(2) Date: Dec. 22, 2016

(87) PCT Pub. No.: WO2016/135971
PCT Pub. Date: Sep. 1, 2016

(65) Prior Publication Data
US 2017/0199050 A1  Jul. 13, 2017

(51) Int. Cl.
*G06F 3/16* (2006.01)
*G01C 21/36* (2006.01)
(Continued)

(52) U.S. Cl.
CPC ....... *G01C 21/3617* (2013.01); *G01C 21/343* (2013.01); *G01C 21/3676* (2013.01);
(Continued)

(58) Field of Classification Search
CPC .. G06F 3/0482; G06F 3/04847; G06F 3/0486; G06F 3/147; G06F 17/30;
(Continued)

(56) References Cited

U.S. PATENT DOCUMENTS

| 2007/0288155 | A1  | 12/2007 | Kaneda  |              |
|--------------|-----|---------|---------|--------------|
| 2008/0033633 | A1* | 2/2008  | Akiyoshi | G01C 21/343 |
|              |     |         |         | 701/418      |
| 2010/0146397 | A1* | 6/2010  | Koch    | G01C 21/00   |
|              |     |         |         | 715/739      |
| 2014/0278070 | A1* | 9/2014  | McGavran | G01C 21/00  |
|              |     |         |         | 701/465      |

FOREIGN PATENT DOCUMENTS

| JP | 2005-233628 A | 9/2005 |
| JP | 2010-026975 A | 2/2010 |

(Continued)

OTHER PUBLICATIONS

English translation of the International Search Report for PCT/JP2015/055955.

(Continued)

*Primary Examiner* — Anil N Kumar
(74) *Attorney, Agent, or Firm* — HEA Law PLLC

(57) ABSTRACT

A user is induced to have the same experience as displayed in an image. Means that obtains content stored in a route search system obtains content stored in storing means for storing a plurality of items of image data, location information, and time information in association with one another. Display controlling means displays some of the items of image data on display means. Receiving means receives a selection of a location to visit from the displayed items of image data. Searching means determines a visiting location based on location information of the image data of the selected location, determines a visiting time based on time information of the image data, and searches a route for visiting the visiting location on the visiting time.

15 Claims, 19 Drawing Sheets

(51) Int. Cl.
| | |
|---|---|
| *G06F 3/0482* | (2013.01) |
| *G06F 3/0484* | (2013.01) |
| *G06F 3/0486* | (2013.01) |
| *G06F 3/147* | (2006.01) |
| *G01C 21/34* | (2006.01) |
| *G09G 5/14* | (2006.01) |
| *G06F 16/00* | (2019.01) |
| *G09B 29/00* | (2006.01) |

(52) U.S. Cl.
CPC .......... *G06F 3/0482* (2013.01); *G06F 3/0486* (2013.01); *G06F 3/04847* (2013.01); *G06F 3/147* (2013.01); *G06F 16/00* (2019.01); *G09G 5/14* (2013.01); *G09B 29/007* (2013.01)

(58) Field of Classification Search
CPC .............. G01C 21/3617; G01C 21/343; G01C 21/3676; G09G 5/14
See application file for complete search history.

(56) References Cited

FOREIGN PATENT DOCUMENTS

| | | |
|---|---|---|
| JP | 2012-037475 A | 2/2012 |
| JP | 2013-164309 A | 8/2013 |

OTHER PUBLICATIONS

Partial Transalation of the Office Action dated Apr. 5, 2016 for corresponding JP application No. 2015-562619.

Gengo Suzuki, "Time Constrained Trip Planning Search System",IPSJ Journal "Network Services and Distributed Processing",Japan, Information Processing Society of Japan, Feb. 15, 2012, vol. 53, No. 2, pp. 857-867, Concise Explanation of Relevance is Partial Translation of the OA of Apr. 5, 2016.

* cited by examiner

FIG.10

| IMAGE DATA | LOCATION INFORMATION | TIME INFORMATION |
|---|---|---|
| IMAGE DATA A | N 35° 51′ 3″ | 2015/2/26 15:00 |
| | E 140° 0′ 54″ | |
| ⋮ | ⋮ | ⋮ |

FIG.11

| VISITING ORDER | VISITING LOCATION | | VISITING TIME |
|---|---|---|---|
| 1 | STATION A | N 34° 49′ 12″<br>E 140° 1′ 13″ | 2015/2/27 12:00 |
| 2 | SHRINE C | N 34° 12′ 0″<br>E 140° 2′ 51″ | 2015/2/27 14:00 |
| 3 | BRIDGE B | N 34° 20′ 15″<br>E 140° 3′ 10″ | 2015/2/27 16:00 |
| 4 | FALLS D | N 34° 60′ 47″<br>E 140° 3′ 51″ | 2015/2/27 17:00 |
| ⋮ | ⋮ | | ⋮ |

FIG.14

| IMAGE DATA | LOCATION INFORMATION | TIME INFORMATION | LOCATION ATTRIBUTE INFORMATION |
|---|---|---|---|
| IMAGE DATA A | N 35° 51' 3" | 2015/2/26 15:00 | RESTAURANT |
| | E 140° 0' 54" | | |
| ⋮ | ⋮ | ⋮ | ⋮ |

FIG.15

| LOCATION ATTRIBUTE INFORMATION | STAYING TIME |
|---|---|
| RESTAURANT | 60 MIN |
| SHRINE | 30 MIN |
| ⋮ | ⋮ |

FIG.17

| IMAGE DATA | LOCATION INFORMATION | TIME INFORMATION | PERSON INFORMATION |
|---|---|---|---|
| IMAGE DATA A | N 35° 51′ 3″<br>E 140° 0′ 54″ | 2015/2/26 15:00 | W/O PERSON |
| IMAGE DATA B | N 35° 50′ 7″<br>E 140° 2′ 23″ | 2015/2/26 17:50 | W/PERSON |
| ⋮ | ⋮ | ⋮ | ⋮ |

FIG.18

| IMAGE DATA | LOCATION INFORMATION | TIME INFORMATION | POPULARITY INFORMATION |
|---|---|---|---|
| IMAGE DATA A | N 35° 51′ 3″ | 2015/2/26 15:00 | 50 |
| | E 140° 0′ 54″ | | |
| IMAGE DATA B | N 35° 50′ 7″ | 2015/2/26 17:50 | 100 |
| | E 140° 2′ 23″ | | |
| ⋮ | ⋮ | ⋮ | ⋮ |

FIG.19

| IMAGE DATA | LOCATION INFORMATION | TIME INFORMATION | SIMILARITY INFORMATION |
|---|---|---|---|
| IMAGE DATA A | N 35°51′3″ | 2015/2/26 15:00 | 1 |
| | E 140°0′54″ | | |
| IMAGE DATA B | N 35°50′7″ | 2015/2/26 17:50 | 2 |
| | E 140°2′23″ | | |
| IMAGE DATA C | N 35°51′2″ | 2015/2/27 14:30 | 1 |
| | E 140°0′53″ | | |
| ⋮ | ⋮ | ⋮ | ⋮ |

ROUTE SEARCH SYSTEM, ROUTE SEARCH DEVICE, ROUTE SEARCH METHOD, PROGRAM, AND INFORMATION STORAGE MEDIUM

CROSS REFERENCE TO RELATED APPLICATIONS

This application is a National Stage of International Application No. PCT/JP2015/055955 filed on Feb. 27, 2015. The contents of the above document is incorporated herein by reference in its entirety.

TECHNICAL FIELD

The present invention relates to a route search system, a route search device, a route search method, a program, and an information storage medium.

BACKGROUND ART

There are known techniques for notifying a user with a location for shooting an image. For example, Patent Literature 1 describes displaying an image and its shooting location in association with each other on a map, thereby making a shooting position of the image easily understandable.

CITATION LIST

Patent Document

Patent Literature 1: JP2010-026975A

SUMMARY OF INVENTION

Technical Problem

In such technique as above, a user sometimes visit a shooting location of an image of interest in order to have the same experience as displayed in the image. However, even though the user actually visits the shooting location of the image, they cannot necessarily have the same experience as in the image. For example, if the user is interested in an image captured in the evening and visits the shooting location in the afternoon, actual scenes appear differently from the image, and thus the user cannot have the same experience as in the image.

One or more embodiments of the present invention have been conceived in view of the above, and an object thereof is to provide a route search system, a route search device, a route search method, a program, and an information storage medium for enabling a user to have the same experience as displayed in an image.

Solution to Problem

In order to solve the above described problems, a route search system according to the present invention includes means for obtaining content stored in storing means that stores a plurality of items of image data respectively in association with location information and time information, display controlling means for displaying some of the plurality of items of image data on display means, receiving means for receiving a selection of a location to visit from the displayed items of image data, and searching means for determining a visiting location based on location information of image data of the selected location, determining a visiting time based on time information of the image data, and searching a route for visiting the visiting location on the visiting time.

A route search device according to the present invention includes means for obtaining content stored in storing means that stores a plurality of items of image data respectively in association with location information and time information, display controlling means for displaying some of the plurality of items of image data on display means, receiving means for receiving a selection of a location to visit from the displayed items of image data, and searching means for determining a visiting location based on location information of image data of the selected location, determining a visiting time based on time information of the image data, and searching a route for visiting the visiting location on the visiting time.

A route search method according to the present invention includes a step of obtaining content stored in storing means that stores a plurality of items of image data respectively in association with location information and time information, a display controlling step of displaying some of the plurality of items of image data on display means, a receiving step of receiving a selection of a location to visit from the displayed items of image data, and a searching step of determining a visiting location based on location information of image data of the selected location, determining a visiting time based on time information of the image data, and searching a route for visiting the visiting location on the visiting time.

A program according to the present invention causes a computer to function as means for obtaining content stored in storing means that stores a plurality of items of image data respectively in association with location information and time information, display controlling means for displaying some of the plurality of items of image data on display means, receiving means for receiving a selection of a location to visit from the displayed items of image data, and searching means for determining a visiting location based on location information of image data of the selected location, determining a visiting time based on time information of the image data, and searching a route for visiting the visiting location on the visiting time.

An information storage medium according to the present invention is a computer-readable information storage medium that stores the program.

In one aspect of the present invention, the display controlling means displays, on the display means, an item of image data associated with the location information according to the visiting location and the time information that is later than the visiting time, the receiving means receives a selection of a next location to visit from the displayed items of image data, and the searching means determines a next visiting location based on the location information of image data of the selected next location to visit, determines a next visiting time based on the time information of the image data, and searches the route again so that the next visiting location is visited on the next visiting time.

In one aspect of the present invention, the route search system further includes means for obtaining a staying time in the visiting location, and the display controlling means displays, on the display means, image data associated with the time information after a period of the staying time has passed since the visiting time.

In one aspect of the present invention, the display controlling means displays, on the display means, image data of a visitable location indicated by the location information on a time indicated by the time information after the visiting location is visited on the visiting time.

In one aspect of the present invention, the display controlling means displays, on the display means, image data associated with the location information according to the visiting location and the time information before the visiting time. The receiving means receives a selection of a location to stop by from the displayed items of image data, and the searching means determines a stop-by location based on location information of image data of the selected location to stop-by, determines a stop-by time based on time information of the image data, and searches the route again so that the stop-by location is visited on the stop-by time.

In one aspect of the present invention, the display controlling means displays, on the display means, an item of the image data that can be stopped by on a location indicated by the location information and on a time indicated by the time information so that the visiting location is visited on the visiting time.

In one aspect of the present invention, the storing means further stores location attribute information in association with each item of the image data, and the display controlling means prevents a display of an item of the image data associated with the location attribute information of the item of the image data that is already selected.

In one aspect of the present invention, the display controlling means prevents a display of image data associated with location information that is less than a predetermined distance from the location information of the item of image data that is already selected.

In one aspect of the present invention, the route search system further includes means for obtaining departure point information, departure time information, final visiting location information, and final visiting time information. The display controlling means displays, on the display means, image data associated with location information according to a route between a departure point indicated by the departure point information and a final visiting location indicated by the final visiting location information, and time information between a departure time indicated by the departure time information and a final visiting time indicated by the final visiting time information, and the searching means searches a route for leaving the departure point on the departure time, visiting the visiting location on the visiting time, and visiting the final visiting location on the final visiting time.

In one aspect of the present invention, the route search system further includes means for determining whether a person is captured in each item of the image data, and the display controlling means prevents an item of the image data, in which a person is captured, from being displayed.

In one aspect of the present invention, the route search system further includes means for obtaining popularity information of each item of the image data, and the display controlling means displays image data based on the popularity information of each item of the image data.

In one aspect of the present invention, the route search system further includes means for determining whether the items of image data are similar to one another, and the display controlling means prevents the similar items of image data from being displayed.

Advantageous Effects of Invention

According to the present invention, it is possible to induce a user to have the same experience as displayed in an image.

BRIEF DESCRIPTION OF DRAWINGS

FIG. 6 is a diagram illustrating an example of the route search screen in a case where the user selects image data as a location that the user wants to stop by;

FIG. 10 is a diagram illustrating an example of data stored in an image table;

FIG. 11 is a diagram illustrating an example of search result data storage;

FIG. 14 is a diagram illustrating an example of data stored in an image table of Variation (1);

FIG. 15 is a diagram illustrating an example of data stored in a staying time table;

FIG. 17 is a diagram illustrating an example of data stored in an image table of Variation (5);

FIG. 18 is a diagram illustrating an example of data stored in an image table of Variation (6); and FIG. 19 is a diagram illustrating an example of data stored in an image table of Variation (7).

DESCRIPTION OF EMBODIMENTS

[1. Hardware Configuration of Route Search System]

Figure 1:
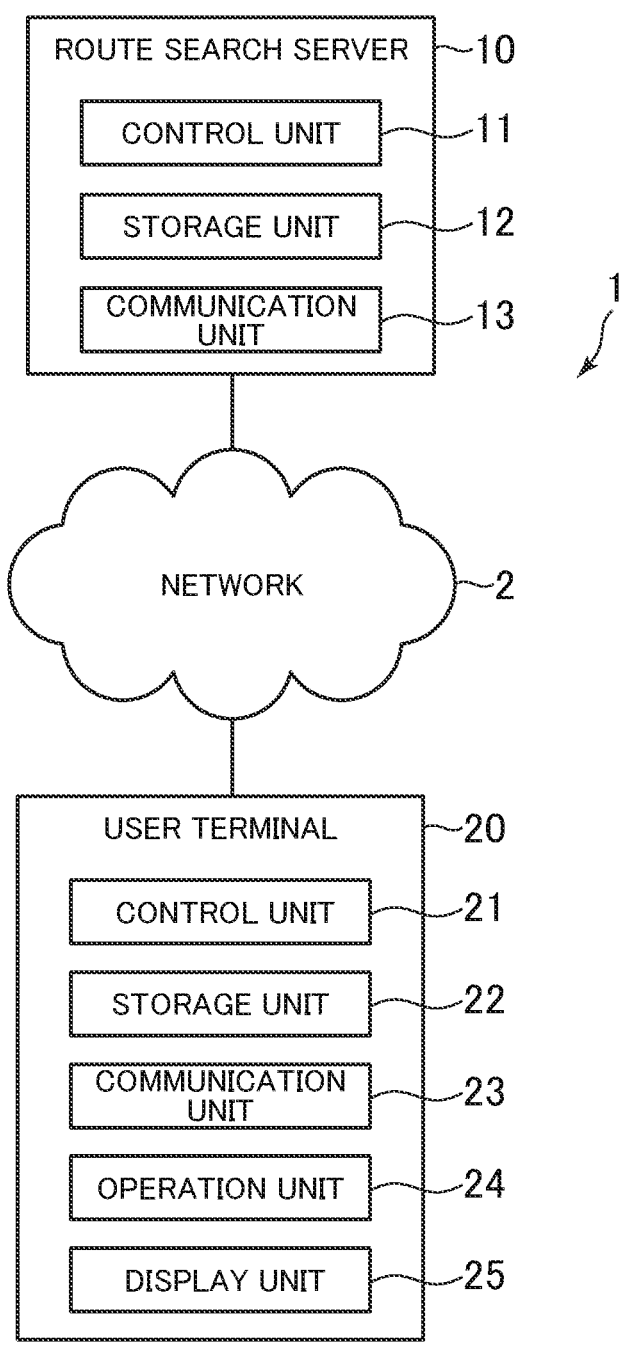
FIG. 1 is a diagram illustrating an overall configuration of a route search system in this embodiment.

An embodiment of the present invention will be described below in detail with reference to the accompanying drawings. FIG. 1 is a diagram illustrating an overall configuration of a route search system in this embodiment. As shown in FIG. 1, the route search system 1 includes a route search server 10 and a user terminal 20. The route search server 10 and the user terminal 20 are connected to each other via a network 2 so as to be capable of mutual data communication.

The route search server 10 is a server computer. The route search server 10 includes a control unit 11, a storage unit 12, and a communication unit 13. The control unit 11 includes, for example, one or more microprocessors. The control unit 11 executes processing according to a program and data stored in the storage unit 12. The storage unit 12 includes a main storage unit and an auxiliary storage unit. For example, the main storage unit is a RAM, and the auxiliary storage unit is a hard disk or a solid-state drive. The communication unit 13 includes a network card. The communication unit 13 performs data communication through the network 2.

The user terminal 20 is a computer operated by a user, such as a mobile phone (including smart phone), a portable information terminal (including tablet computer), and a personal computer. The user terminal 20 includes a control unit 21, a storage unit 22, a communication unit 23, an operation unit 24, and a display unit 25. The control unit 21, the storage unit 22, and the communication unit 23 respectively share the same hardware configuration with the control unit 11, the storage unit 12, and the communication unit 13, and thus duplicated explanation will be omitted.

The operation unit 24 is an operating member for the user to perform operation, such as a touch panel, a mouse, and a touch panel. The operation unit 24 sends an operation of the user to the control unit 21. The display unit 25 is, for example, a liquid crystal display unit or an organic EL display unit. The display unit 25 displays a screen as indicated by the control unit 21.

The program and the data described as being stored in the storage unit 12 or the storage unit 22 may be provided to the storage unit 12 or the storage unit 22 via the network 2. The hardware configuration of the route search server 10 and the user terminal 20 is not limited to the above example, and various types of computer hardware may be applicable. For example, each of the route search server 10 and the user terminal 20 may include a reader (e.g., optical disc drive and memory card slot) for reading a computer-readable information storage medium. In this case, a program or data stored in the information storage medium may be provided to the storage unit 12 or the storage unit 22 through the reader.

[2. Overview of Processing Executed in Route Search System]

Next, an overview of the processing executed in the route search system 1 will be discussed. In this embodiment, the display unit 25 displays a plurality of image data items, thereby enabling a user to select an image data item of a location that the user wants to go. When the user selects an image data item of the location that the user wants to go, a route search is performed so that the user visits the shooting location of the image data item on its shooting time. Here, a route search will be explained regarding a case where the user leaves "Station A" on "Feb. 27, 2015 at 12:00." When the user performs a predetermined operation using the operation unit 24, a route search screen for searching a route is displayed on the display unit 25.

Figure 2:
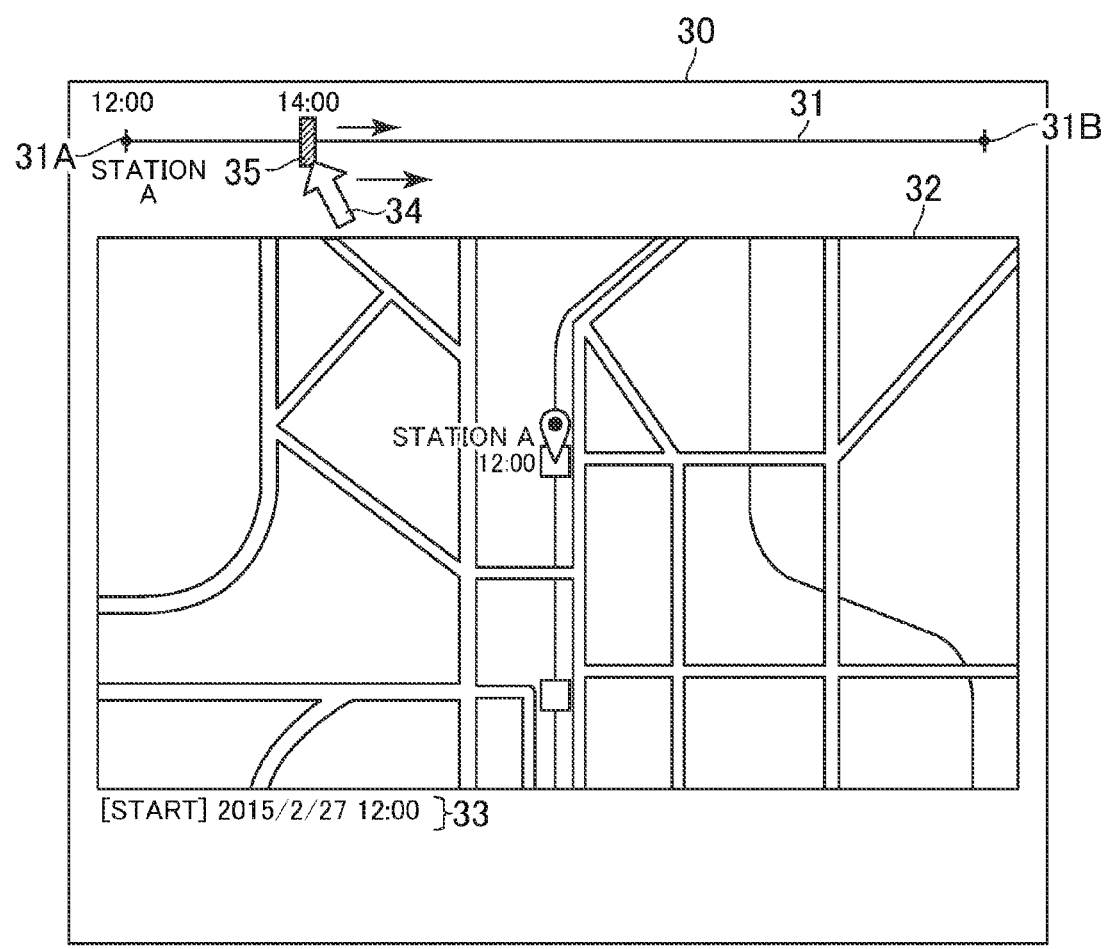
FIG. 2 is a diagram illustrating an example of a route search screen.

FIG. 2 illustrates an example of the route search screen. As shown in FIG. 2, the route search screen 30 displays a time axis 31 for a user to specify time, a map 32 around "Station A", which is the departure point, and a visiting location 33 indicating each visiting location. The time axis 31 closer to one end (in FIG. 2, left endpoint 31A) indicates earlier time, and the time axis 31 closer to the other end (in FIG. 3, right endpoint 31B) indicates later time. In the example of FIG. 2, the left endpoint 31A of the time axis 31 indicates the departure time "Feb. 27, 2015, at 12:00", and the departure point "Station A" is displayed below.

The user uses a cursor 34 to move a bar 35 of the time axis 31 left and right, thereby specifying the time. Here, a case is explained by taking an example in which the user drags and drops the bar 35. For example, a distance between the left endpoint 31A of the time axis 31 and the current position of the bar 35 corresponds to a time interval between the departure time and the time specified by the user, and when the user moves the bar 35, the time corresponding to the current position of the bar 35 is displayed.

Figure 3:
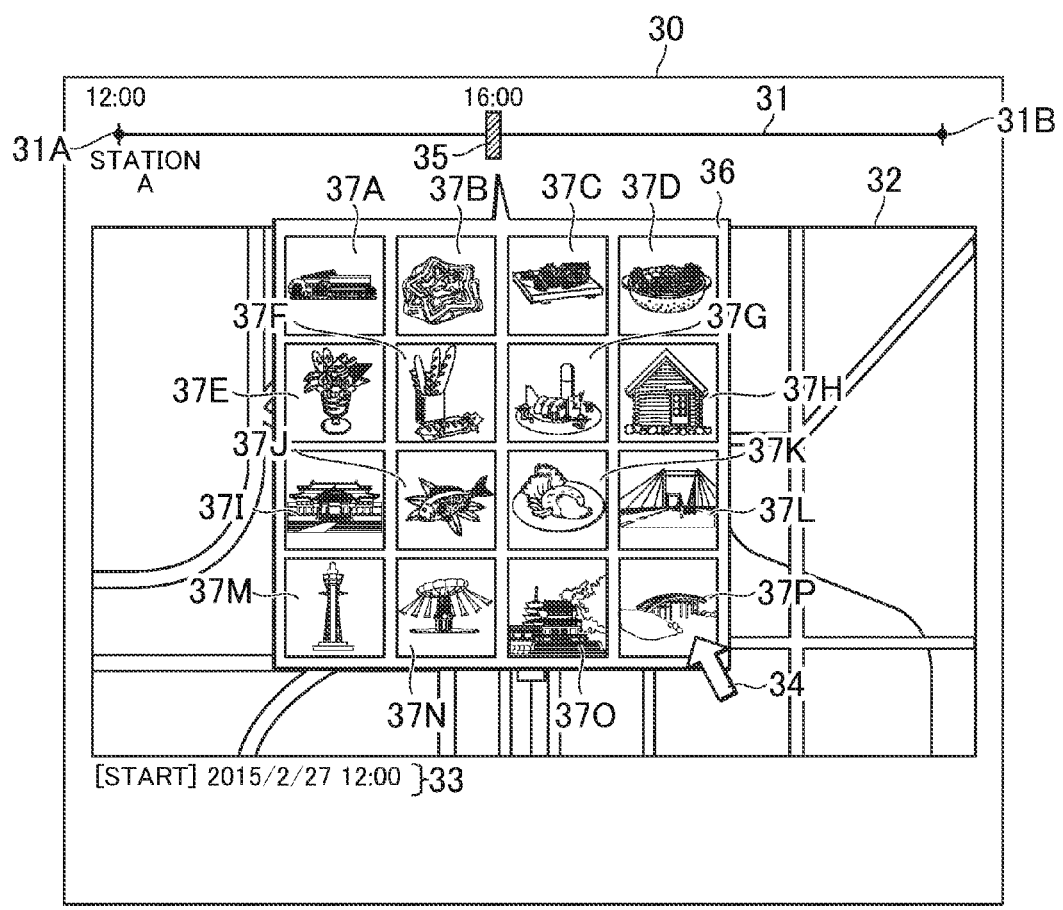
FIG. 3 is a diagram illustrating an example of the route search screen in a case where a user drops a bar at "16:00"

FIG. 3 illustrates an example of the route search screen 30 in a case where the user drops the bar 35 at "16:00." As shown in FIG. 3, a balloon-shaped image list 36 is displayed so as to point the bar 35. The image list 36 may be displayed according to the current position of the bar 35 without the bar 35 being dropped.

The image list 36 includes image data items 37A to 37P (hereinafter these are collectively referred to as "image data 37") that are displayed in a selectable manner. The image data 37 is captured in the real world, and posted on, for example, Social networking services or a word-of-mouth information site. From the image list 36, the user can see the image data 37 taken by themselves or others.

In FIG. 3, the image data 37 displayed in the image list 36 is captured at around "16:00" indicated by the current position of the bar 35 and near "Station A" (e.g., within walking distance of "Station A"). The user selects an item of the image data 37 indicating the location that the user wants to go from the image list 36. Here, a case is explained in which the image data 37P captured at "16:00" and "Bridge B" is selected by the user.

Figure 4:
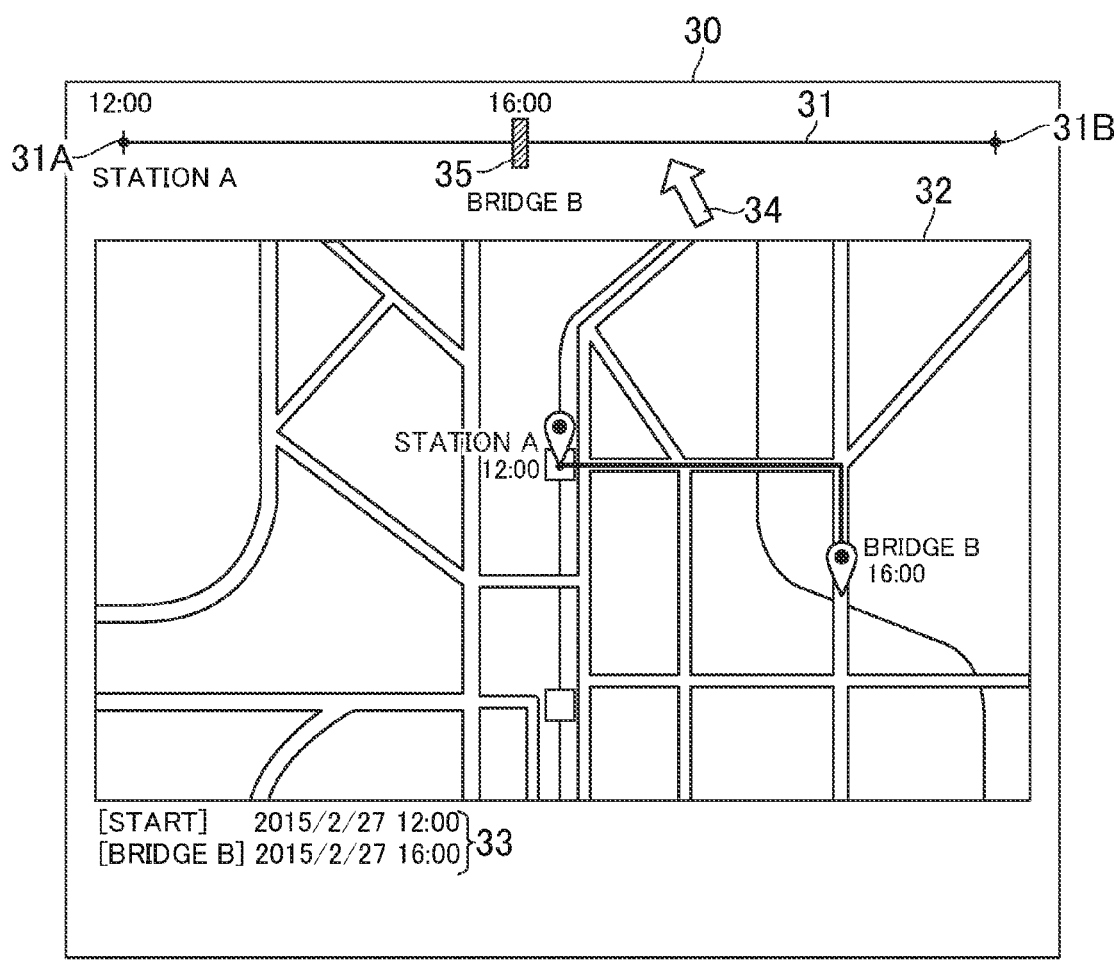
FIG. 4 is a diagram illustrating an example of the route search screen in a case where the user selects image data as a location that the user wants to go.

FIG. 4 illustrates an example of the route search screen 30 in a case where the user selects the image data 37P as the location that the user wants to go. As shown in FIG. 4, a travel route is searched so that the user visits "Bridge B", which is the shooting location of the image data 37P selected by the user, at "16:00", the shooting time of the image data 37P. Then, a route 38 is displayed on a map 32 for guiding the user to leave "Station A" at "12:00" and visit "Bridge B" at "16:00."

Subsequently, the user can select a location to stop by on the way from "Station A" to "Bridge B" by moving the bar 35 to the left, or select a location that the user wants to go after "Bridge B" by moving the bar 35 to the right. For example, when the user moves the bar 35 to the left in the state shown in FIG. 4 and drops the bar at "14:00", the user can select a location to stop by around "14:00."

Figure 5:
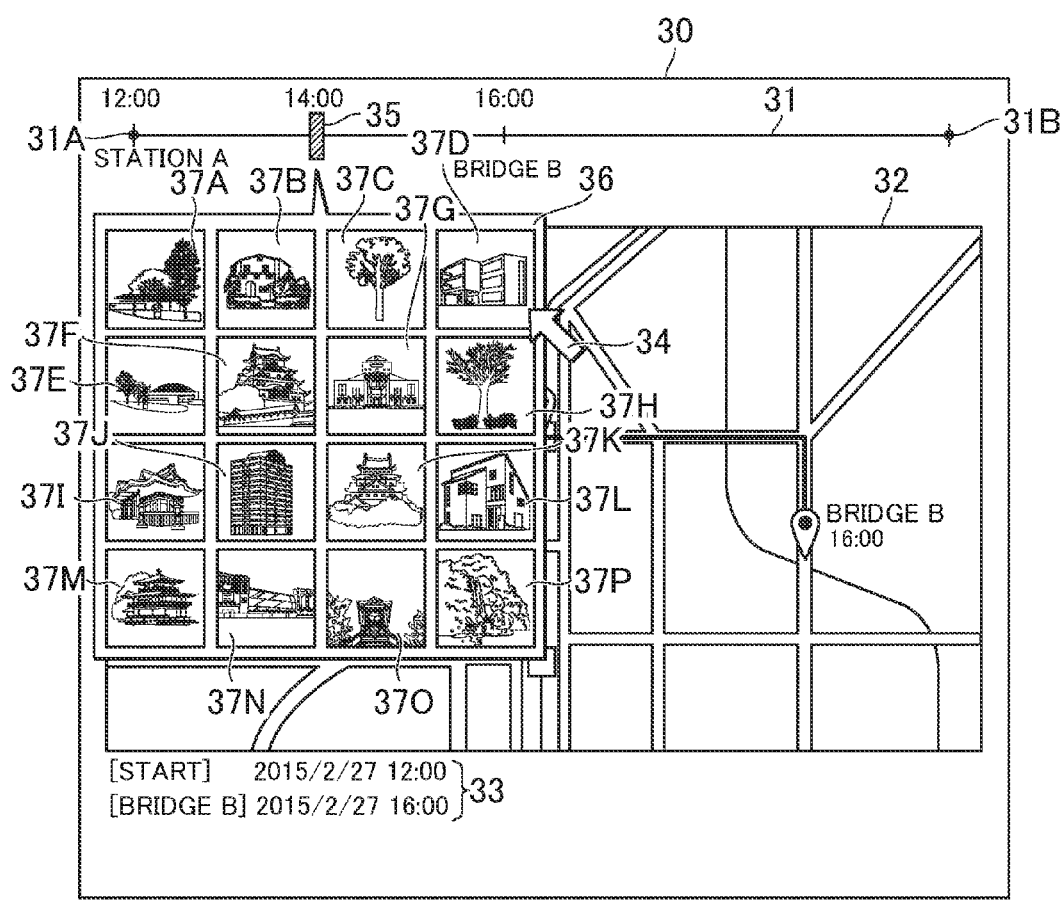
FIG. 5 is a diagram illustrating an example of the route search screen in a case where the user drops a bar at "14:00"

FIG. 5 illustrates an example of the route search screen 30 when the user drops the bar 35 at "14:00." As shown in FIG. 5, the image list 36 is displayed in a way to point the bar 35. The image list 36 displays the image data 37 captured around the location between "Station A" and "Bridge B" around "14:00." In other words, the image list 36 displays the image data 37 including the locations that the user can stop by so that the user can arrive at "Bridge B" at "16:00." The user selects an item of the image data 37 for a location that the user wants to stop by from the image list 36. Here, a case will be explained in which the user selects the image data 37D captured at "Shrine C" at "14:00."

Figure 6:
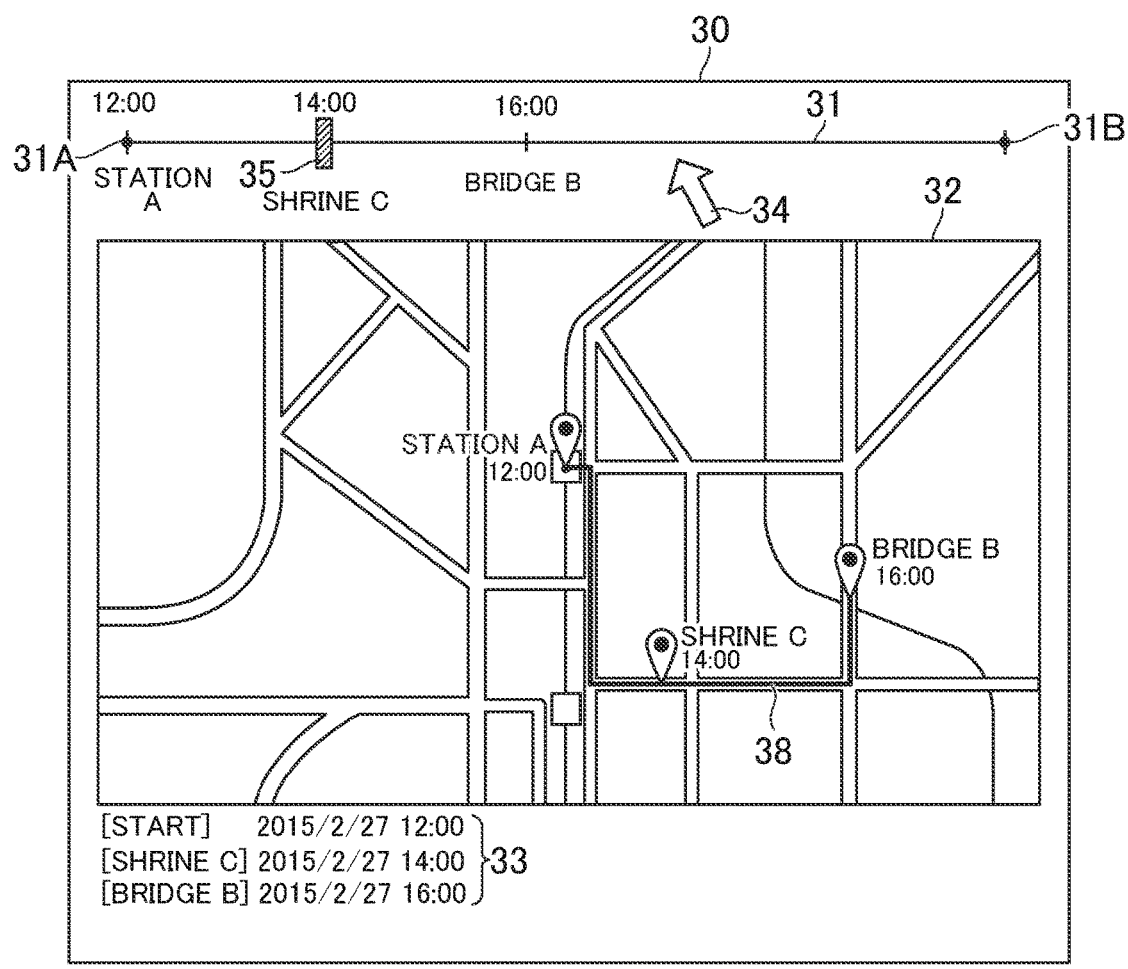

FIG. 6 illustrates an example of the route search screen 30 when the user selects the image data 37D as a location to stop by. As shown in FIG. 6, a travel route is searched so that the user stops by "Shrine C", the shooting location of the image data 37D, at "14:00", the shooting time of the image data 37D. Then the travel route is updated to a route 38 for leaving "Station A" at "12:00", stopping by "Shrine C" at "14:00", and visiting "Bridge B" at "16:00."

In the state shown in FIG. 6, the user can select a location to stop by between "Station A" and "Shrine C" by moving the bar 35 to the left, or select a location to stop by between "Shrine C" and "Bridge B" or a location to visit after "Bridge B" by moving the bar 35 to the right. For example, when the user moves the bar 35 to the right and drops the bar at "17:00", the user can select a location to visit around "17:00" after "Bridge B."

Figure 7:
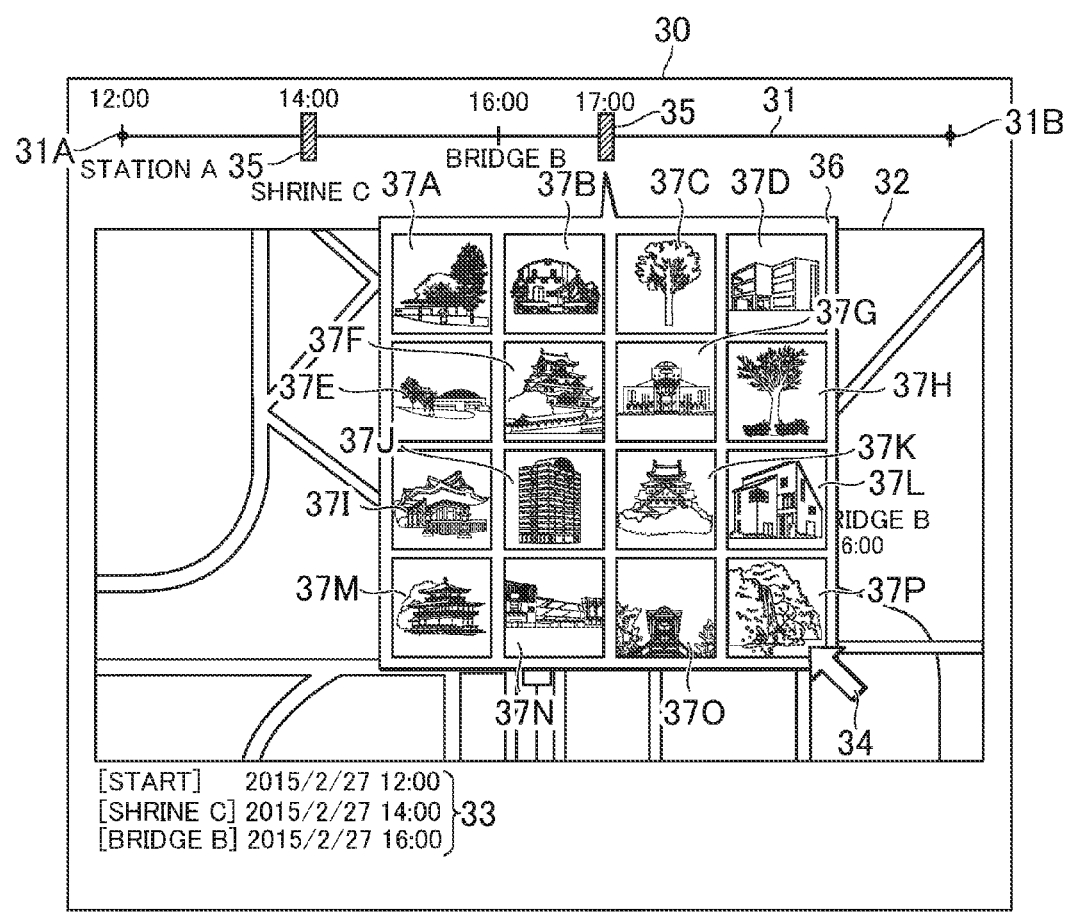
FIG. 7 is a diagram illustrating an example of the route search screen in a case where the user drops a bar at "17:00"

FIG. 7 illustrates an example of the route search screen 30 in a case where the user drops the bar 35 at "17:00." As shown in FIG. 7, the image list 36 is displayed in a way to point the bar 35. The image list 36 displays image data 37 captured around "Bridge B" and around "17:00." In other word, the image list 36 displays the image data 37 including locations that the user can arrive at "17:00" after leaving "Bridge B" at "16:00." The user selects an item of the image data 37 for a location to visit after "Bridge B" from the image list 36. Here, a case will be explained where the user selects the image data 37P captured at "Falls D" at "17:00."

Figure 8:
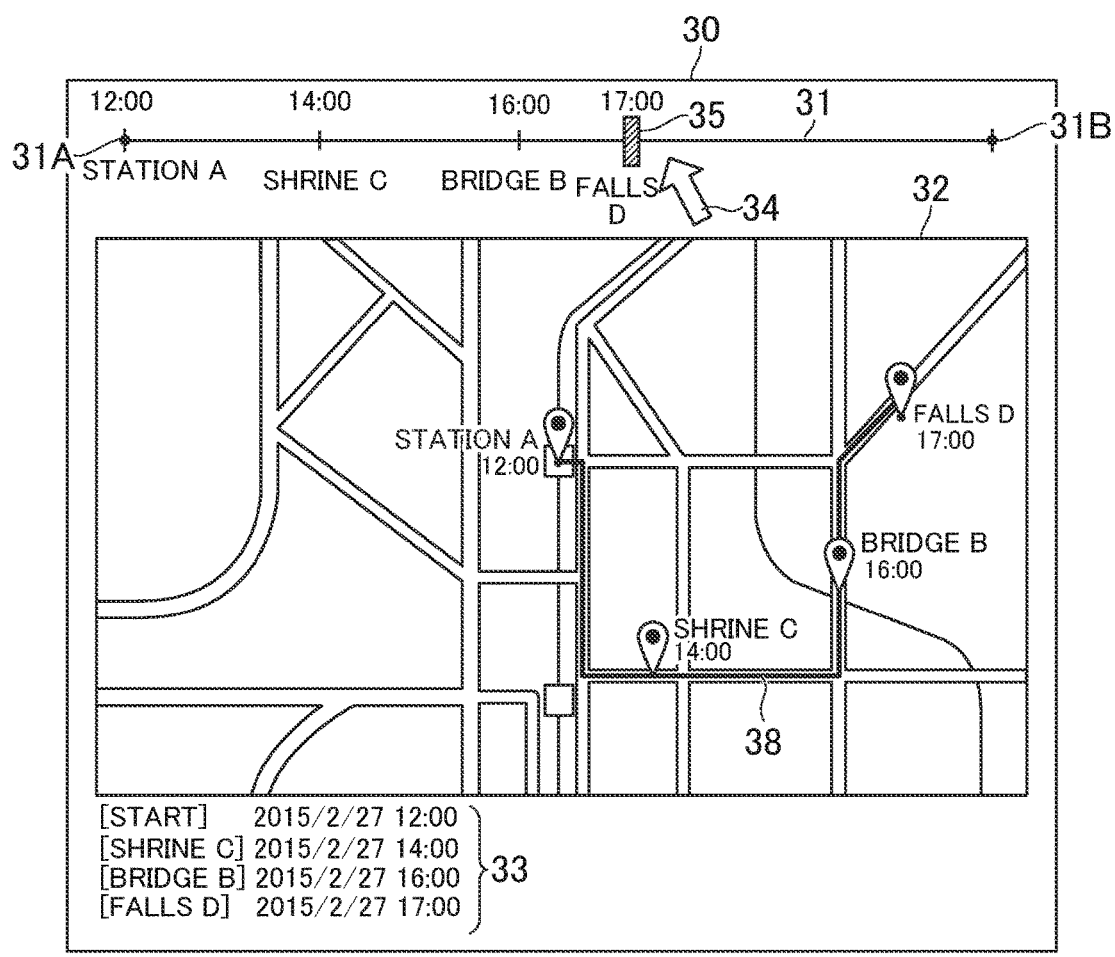
FIG. 8 is a diagram illustrating an example of the route search screen in a case where the user selects image data as a next location that the user wants to go.

FIG. 8 illustrates an example of the route search screen 30 in a case where the user selects the image data 37P as a next location to visit. As shown in FIG. 8, the travel route is updated to a route 38 for visiting "Falls D", the shooting location of the image data 37P selected by the user, at "17:00", the shooting time of the image data 37P. That is, the travel route is updated to the route 38 for leaving "Station A" at "12:00", stopping by "Shrine C" at "14:00", visiting "Bridge B" at "16:00", and then visiting "Falls D" at "17:00."

As described above, in this embodiment, when the user repeats moving the bar 35 and selecting the image data 37 until the route search is finished, the route 38 is searched so that the user visits the shooting location of the image data 37 selected by the user on its shooting time, and thus it is possible to induce the user to have the same experience as displayed in the image data 37. In the following, details of such technology will be discussed.

[3. Functions Implemented in Route Search System]

Figure 9:
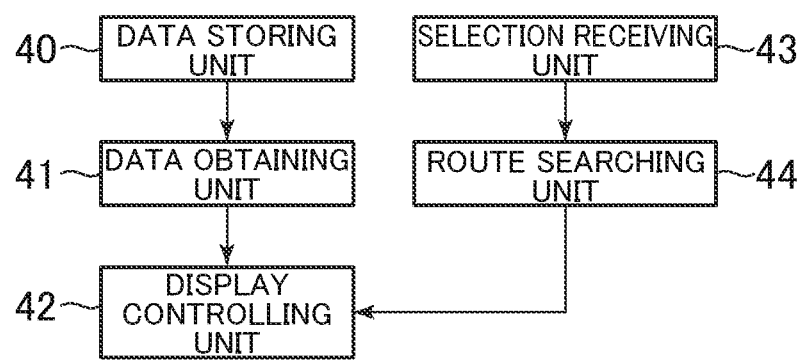
FIG. 9 is a functional block diagram showing an example of functions implemented in the route search system.

FIG. 9 is a functional block diagram showing an example of functions implemented in the route search system 1. As shown in FIG. 9, a data storing unit 40, a data obtaining unit 41, a display controlling unit 42, a selection receiving unit 43, and a route searching unit 44 are implemented in the route search system 1. In this embodiment, a case will be explained in which these functions are implemented in the route search server 10.

[3-1. Data Storing Unit]

The data storing unit 40 is implemented mainly by the storage unit 12. The data storing unit 40 stores various types of data to execute a route search. Here, an image table for storing image data 37 and search result data for storing search results of travel routes are discussed as an example of data stored in the data storing unit 40.

FIG. 10 is a diagram showing an example of data stored in the image table. As shown in FIG. 10, a plurality of items of image data 37, location information, and time information are associated with one another in the image table. The image data 37 is image data of photographs captured in the real world, image data of the processed photographs, CG image data (e.g., CG imitating scenes of the real world), or image data of scanned drawings (e.g., landscape) on paper etc. The image table may store image data 37 itself, or only information indicating a storage location (link) of the image data 37.

The location information is information indicating locations in the real world, for example, latitude/longitude information and address information. The time information is information indicating time associated with an image and may indicate, for example, date and time (including both of date and time), or only time without date. In this embodiment, the location information indicates shooting positions of the image data 37, and the time information indicates shooting time of the image data 37.

For example, the route search server 10 receives a combination of image data 37, location information, and time information from a user terminal 20 or an external computer (e.g., database server and digital camera), and stores the combination in association with one another in the image table. The combination of image data 37, location information, and time information is described as being stored in the storage unit 22 of the user terminal 20 or a storage unit of the external computer. Further, the location information and the time information may be specified by the user, or generated automatically.

FIG. 11 is a diagram showing an example of search result data storage. As shown in FIG. 11, the search result data includes visiting orders, visiting locations, and visiting times in association with one another. The search result data is updated according to a result of a route search executed by the route searching unit 44. FIG. 11 shows an example of storing search result data when a route search is executed as shown in FIG. 8.

For example, a visiting location of the first visiting order stores the location of the departure point "Station A", and a visiting time of the first visiting order stores the departure time "Feb. 27, 2015, at 12:00." Visiting locations of the second or subsequent visiting orders store respective visiting locations (in FIG. 11, "Shrine C", "Bridge B", and "Falls D"), and visiting times of the second or subsequent visiting orders store respective visiting times (in FIG. 11, "14:00", "16:00", and "17:00" of "Feb. 27, 2015") of the visiting locations.

Examples of data stored in the data storing unit 40 are not limited to the above description. The data storing unit 40 may store data required for executing a route search according to the present invention. For example, the data storing unit 40 may store image data of each image included in the route search screen 30, or map data indicating a map 32. Alternatively, the data storing unit 40 may store a route search algorithm and data showing relationship between the position of the bar 35 and time.

[3-2. Data Obtaining Unit]

The data obtaining unit 41 is implemented mainly by the control unit 11. The data obtaining unit 41 obtains content stored in the data storing unit 40 that stores items of the image data 37, location information, and time information in association with one another. The data obtaining unit 41 refers to the data storing unit 40 and obtains various types of data such as an image table and search result data.

[3-3. Display Controlling Unit]

The display controlling unit 42 is implemented mainly by the control unit 11. The display controlling unit 42 displays some items of the image data 37 on the display unit 25. Some items of the image data 37 displayed by the display controlling unit 42 indicate candidates to visit. In this embodiment, the display controlling unit 42 displays the image list 36 based on content obtained by the data obtaining unit 41. Further, in this embodiment, a case is explained in which the display controlling unit 42 is implemented by the route search server 10, and thus sending display data of the image list 36 to the user terminal 20 corresponds to displaying some items of the image data 37 on the display unit 25.

The display controlling unit 42 may display all of the image data 37 stored in the image table, or a part of the image data 37. When displaying a part of the image data 37, the display controlling unit 42 specifies items of the image data 37 to be displayed from the image table based on a predetermined method.

For example, the display controlling unit 42 specifies the image data 37 to display based on at least one of the position and the time that are specified by the user. The position specified by the user is a position that the user specifies using the operation unit 24, for example, the departure point specified by the user. The time specified by the user is time that the user specifies using the operation unit 24, for example, the departure time specified by the user and the time specified in the time axis 31.

For example, the display controlling unit 42 specifies an item of the image data 37 to display based on the position specified by the user. The display controlling unit 42 specifies an item of the image data 37 to display based on a difference between the position specified by the user and the position indicated by the location information stored in the image table (e.g., distance). The display controlling unit 42 may specify a predetermined number of items of the image data 37 in an order from an item having the smallest difference to an item having the greatest difference, or specify items of the image data 37 having the difference within a reference value (e.g., within 1 km).

Further, for example, the display controlling unit 42 specifies the image data 37 to display based on the time specified by the user. The display controlling unit 42 specifies an item of the image data 37 to display based on a difference (e.g., time interval) between the time specified by the user and the time indicated by the time information stored in the image table. The display controlling unit 42 may specify a predetermined number of items of the image data 37 in an order from an item having the smallest difference to an item having the greatest difference, or specify items of the image data 37 having the difference within a reference value (e.g., within 30 minutes).

In a case where the user has already selected an item of the image data 37 and selects a next location to visit (e.g., FIG. 7), the display controlling unit 42 displays the image data 37 associated with the location information according to the visiting location (in FIG. 7, "Bridge B") and the time information after the visiting time (in FIG. 7, "17:00", which is after the visiting time of "16:00" to "Bridge B"), on the display unit 25. The location information according to the visiting location is location information about an area around the visiting location, where a difference between the location information and the visiting location is within a reference range (less than a reference distance). The time information after the visiting time is time information (date and time or only time may be considered) later than the visiting time.

Further, for example, the display controlling unit 42 may display, on the display unit 25, the image data 37 indicating locations that the user can visit on the time indicated by the time information and the location information after the user visits the visiting location on the visiting time. In this case, the display controlling unit 42 specifies an item of the image data 37 having a difference from the time specified by the user within a reference value. Subsequently, the display controlling unit 42 obtains a visiting location (in FIG. 7, a location of "Bridge B") and a visiting time that are closest to the time specified by the user. The display controlling unit 42 calculates an estimated arrival time on a position indicated by location information of each of the specified items of the image data 37 after the user leaves the obtained visiting location on the obtained visiting time. The display controlling unit 42 specifies an item of the image data 37 having the calculated estimated arrival time earlier than the time indicated in the time information as an item of the image data 37 to display.

Various known techniques may be applicable to the method for calculating the estimated arrival time. For example, the display controlling unit 42 searches a travel route for the user leaving the visiting location closest to the time specified by the user to the position indicated by the location information of the image data 37. The display controlling unit 42 calculates an estimated arrival time based on the estimated traveling time obtained by dividing the searched travel route by a given travelling speed. For example, the display controlling unit 42 calculates, as the estimated arrival time, the time after the estimated traveling time elapses since the visiting time closest to the time specified by the user.

In a case where the user has already selected an item of the image data 37 and selects a next location to stop by (e.g., FIG. 5), the display controlling unit 42 displays, on the display unit 25, the image data 37 associated with the location information according to the visiting location (in FIG. 5, "Bridge B") and the time information before the visiting time (in FIG. 5, "14:00", which is before the visiting time of "16:00" to "Bridge B"). The time information before the visiting time is time information (date and time or only time may be considered) earlier than the visiting time.

Further, for example, the display controlling unit 42 may display, on the display unit 25, the image data 37 indicating locations that the user can stop by on the time indicated by the time information and the location information so that the user can visit the visiting location on the visiting time. In this case, the display controlling unit 42 specifies items of an item of the image data 37 having a difference from the time specified by the user being within a reference value. The display controlling unit 42 then obtains a visiting location (in FIG. 7, the location of "Bridge B") and a visiting time, respectively subsequent to the time specified by the user. The display controlling unit 42 calculates an estimated arrival time on the visiting location when the user leaves the position indicated by location information of each of the specified items of the image data 37 on the time indicated by the time information. The method for calculating the estimated arrival time is the same as the method described above. The display controlling unit 42 specifies an item of the image data 37 having the calculated estimated arrival time before the visiting time of the subsequent location as an item of the image data 37 to display.

[3-4. Selection Receiving Unit]

The selection receiving unit 43 is implemented mainly by the control unit 11. The selection receiving unit 43 receives a selection from the image data 37 displayed by the display controlling unit 42 as a location to visit. The selection receiving unit 43 receives the selection from the image list 36 based on an operation signal of the operation unit 24. In this embodiment, a case is explained in which the selection receiving unit 43 is implemented by the route search server 10, and thus receiving information for identifying an item of the image data 37 selected by the user from the user terminal 20 corresponds to receiving a selection of a location to visit.

As shown in FIG. 7, if the user has already selected an item of the image data 37 and selects a next location to visit, the selection receiving unit 43 receives a selection of the next location to visit from the displayed image data 37. On the other hand, as shown in FIG. 5, if the user has already selected an item of the image data 37, and selects a location to stop by, the selection receiving unit 43 receives a selection of the location to stop by from the displayed image data 37.

[3-5. Route Searching Unit]

The route searching unit 44 is implemented mainly by the control unit 11. The route searching unit 44 determines a visiting location based on location information of the selected item of the image data 37 to visit, determines a visiting time based on time information of the item of the image data 37, and searches a route 38 enabling the user to visit the visiting location on the visiting time. The route searching unit 44 stores, in the search result data, the visiting location and the visiting time in association with a visiting order. The visiting order may be determined in accordance with temporal context between the newly determined visiting time and the visiting time originally stored in the search result data.

The route searching unit 44 may simply determine location information of the item of the image data 37 selected by the user as the visiting location, or determine any position (e.g., a position having a positional difference within a reference range) in an area including location information of the item of the image data 37 selected by the user as the visiting location. In this embodiment, a case is explained in which the location information of the item of the image data 37 selected by the user is simply used as visiting location.

The route searching unit 44 may simply determine time information of the item of the image data 37 selected by the user as the visiting time, or determine any time (e.g., time having a time difference within a reference value) in a period including the time indicated by the time information of the item of the image data 37 selected by the user as the visiting time. Alternatively, for example, the route searching unit 44 may simply determine the time specified in the time axis 31 by the user as the visiting time. In this embodiment, a case is explained in which the time information of the item of the image data 37 selected by the user is simply used as the visiting time.

The route searching unit 44 searches a route 38 based on the determined visiting location and visiting time and the predetermined route search algorithm. For example, the route searching unit 44 searches the route 38 for enabling the user to visit each visiting location on each visiting time in the visiting order stored in the search result data. Various known algorithms, such as Dijkstra and A-star, can be applicable to the route search algorithm.

As shown in FIG. 7, if the user has already selected an item of the image data 37 and selects a next location to visit, the route searching unit 44 determines the next visiting location based on the location information of the item of the image data 37 selected by the user as the next location to visit, determines a next visiting time based on the time information of the item of the image data 37, and searches a route 38 again for the user to visit the next visiting location on the next visiting time. The method for determining the next visiting location and the next visiting time and the method for searching the route 38 are the same as described above. That is, in this embodiment, a case is explained in which location information of the item of the image data 37 selected by the user is simply determined as the next visiting location, and time information of the item of the image data 37 selected by the user is simply determined as the next visiting time.

On the other hand, as shown in FIG. 5, if the user has already selected an item of the image data 37 and selects a next location to stop by, the route searching unit 44 determines a stop-by location based on the location information of the selected image of the image data 37 to stop by, determines a stop-by time based on the time information of the item of the image data 37, and searches a route 38 again for the user to stop by the stop-by location on the stop-by time. The method for determining the stop-by location and the stop-by time and the method for searching the route 38 are the same as described above. That is, in this embodiment, a case is explained in which location information of the item of the image data 37 selected by the user is simply determined as the stop-by location, and time information of the item of the image data 37 selected by the user is simply determined as the stop-by time.

[4. Processing Executed in Route Search System]

Figure 12:
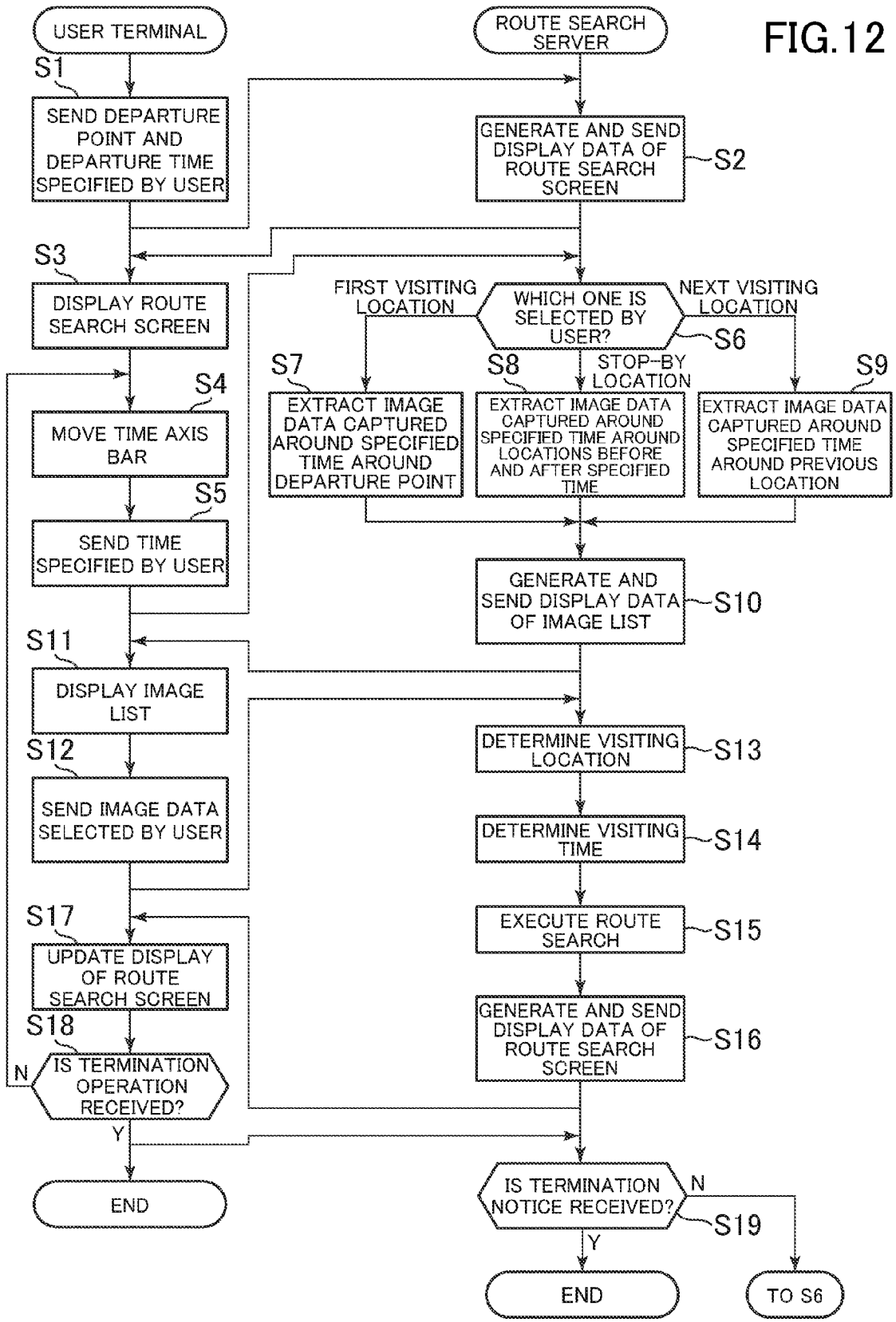
FIG. 12 is a flow chart showing an example of processing executed in the route search system.

FIG. 12 is a flow chart showing an example of processing executed in the route search system 1. The processing shown in FIG. 12 is executed when the control unit 11 operates according to the program stored in the storage unit 12 and the control unit 21 operates according to the program stored in the storage unit 22. In this embodiment, the processing described below is executed, whereby the functional block shown in FIG. 9 is implemented.

As shown in FIG. 12, in the user terminal 20, the control unit 21 receives a departure point and a departure time each specified by the user, and sends data indicating the departure point and the departure time each specified by the user to the route search server 10 (S1). In S1, the control unit 21 displays a screen for receiving the specified departure point and departure time on the display unit 25, and specifies the departure point and the departure time based on a detection signal from the operation unit 24. For example, on this screen, an input form for entering a departure point and a departure time may be displayed, or a map 32 may be displayed so as to specify a departure point in accordance with a position specified by the user on the map 32.

When the route search server 10 receives the data, the control unit 11 generates display data of the route search screen 30 and sends the generated data to the user terminal 20 (S2). In S2, the control unit 11 generates search result data, and stores the departure point and the departure time each specified by the user in the "first" visiting order. Subsequently, the control unit 11 refers to the map data stored in the storage unit 12, and extracts a map 32 around the departure point specified by the user. The control unit 11 then determines a display manner of the time axis 31 so as to indicate the departure time specified by the user, and generates display data of the route search screen 30 based on the extracted map 32 and the display manner of the time axis 31. Various types of data, such as HTML format, may be applicable to display data.

When the user terminal 20 receives the display data, the control unit 21 displays the route search screen 30 on the display unit 25 (S3). The control unit 21 moves the bar 35 of the time axis 31 according to the user's operation (S4), and sends data indicating the time specified by the user to the route search server 10 (S5). In S4, the control unit 21 moves the bar 35 based on the detection signal from the operation unit 24. In S5, the control unit 21 specifies the time specified by the user based on a distance between a position where the user drops the bar 35 and the left endpoint 31A of the time axis 31. The data indicating correspondence between the distance and the time may be included in the display data of the route search screen 30.

When the route search server 10 receives the data, the control unit 11 determines which one of the first visiting location, the stop-by location, and the next visiting location is to be selected by the user (S6). In S6, the control unit 11 refers to the search result data, and determines that the user selects the first visiting location when a location to visit has not been determined, determines that the user selects the stop-by location when a location to visit after the time specified by the user has been already determined, and determines that the user selects the next visiting location when a location to visit after the time specified by the user has not been determined.

When the user selects the first visiting location (S6; first visiting location), the control unit 11 extracts the image data 37 captured around the time specified by the user around the departure point (S7). In S7, the control unit 11 extracts a predetermined number of items of the image data 37 from the image table for the locations that the user can visit at the time specified by the user in the time axis 31 after the user leaves the departure point specified by the user.

On the other hand, when the user selects the stop-by location (S6; stop-by location), the control unit 11 extracts items of the image data 37 captured around the time specified by the user around the locations before and after the specified time (S8). The locations before and after the specified time are a visiting location (or a departure point) immediately before the time specified by the user and a visiting location after the time specified by the user. In S8, the control unit 11 extracts a predetermined number of items of the image data 37 from the image table for the locations that the user can visit at the time specified by the user in the time axis 31 after the user leaves the previous visiting location on the visiting time, and that the user leaves on the time specified in the time axis 31 and can visit the next visiting location on the visiting time.

On the other hand, when the user selects the next visiting location (S6; next visiting location), the control unit 11 extracts items of the image data 37 captured around the time specified by the user around the previous location (S9). The previous location is a visiting location being visited immediately before the time specified by the user. In S9, the control unit 11 extracts a predetermined number of items of the image data 37 from the image table for the locations that the user can visit at the time specified by the user in the time axis 31 after the user leaves the previous visiting location on the visiting time.

The control unit 11 generates display data of the image list 36 and sends the generated data to the user terminal 20 based on the image data 37 extracted in one of S7 to S9 (S10). In S10, the control unit 11 generates display data of the image list 36 such that the items of the image data 37 extracted in one of S7 to S9 are arranged in order. The order of items of the image data 37 may be determined based on a predetermined method. For example, items of the image data 37 may be arranged in an order from an item with time information having the smallest difference from the time specified by the user to an item with the greatest difference from the time specified by the user.

When the user terminal 20 receives the display data, the control unit 21 displays the image list 36 on the display unit 25 (S11). The control unit 21 receives the selected item of the image data 37 from the image list 36, and sends data for identifying the item of the image data 37 selected by the user to the route search server 10 (S12). The information for identifying each item of the image data 37 included in the image list 36 is described as being included in display data of the image list 36.

When the route search server 10 receives data, the control unit 11 determines a visiting location based on location information associated with the item of the image data 37 selected by the user (S13), and determines a visiting time based on time information associated with the selected item of the image data (S14). In S13, the control unit 11 determines a visiting location of one of the first visiting location, the stop-by location, and the next visiting location, and in S14, the control unit 11 determines a visiting time of one of the first visiting location, the stop-by location, and the next visiting location. The method for determining the visiting location and the visiting time is the same as described above. The control unit 11 updates the search result data based on the determination result in S13 and S14.

The control unit 11 executes a route search based on the latest search result data (S15), generates display data of the route search screen 30, and sends the generated data to the user terminal 20 (S16). The method of the route search is the same as described above.

When the user terminal 20 receives the display data, the control unit 21 updates display of the route search screen 30 (S17). In S17, the control unit 21 updates the display of the route search screen 30 as shown in FIGS. 4, 6, and 8, for example.

The control unit 21 determines whether a predetermined termination operation is received (S18). The termination operation is an operation to terminate the processing, and may be a predetermined operation. If it is not determined that the termination operation is received (S18;N), the processing returns to S4. If it is determined that the termination operation is received (S18;Y), the control unit 21 sends a termination notice to the route search server 10, and the processing terminates.

In the route search server 10, the control unit 11 determines whether a termination notice is received (S19). If it is not determined the termination notice is received (S19;N), the processing returns to S6, and if it is determined the termination notice is received (S19;Y), the processing terminates.

According to the route search system as described above, when the user selects one of items of the image data 37 in the image list 36, a route 38 is displayed so that the user visits the shooting location of the selected item on the shooting time of the item, and thus it is possible to provide a user interface that can induce the user to have the same experience as displayed in the image. For example, when the user sees an item of the image data 37 and wants to visit its shooting location, actual scenes appear differently from the image unless the user visits the location around its shooting time, and thus the user may not have the same experience as displayed in the image data 37. In this regard, the route search system 1 determines the visiting time based on the time information of the image data 37, thereby surely enabling the user to have the same experience as displayed in the image data 37. Further, for example, in a case where an item of the image data 37 is captured in a large facility, such as a theme park, the user may not be able to visit its shooting location because the detailed shooting location in the facility is not known. In this regard, the route search system 1 determines the visiting location based on the location information of the item of the image data 37, thereby surely enabling the user to have the same experience as displayed in the image data 37.

After selecting a visiting location from the image list 36, the user can also select an item of the image data 37 as a next location to visit, and can determine visiting locations one after another. As such, for example, it is possible to induce the user to visit a plurality of locations one after another and successively have the same experience as displayed in the image data 37.

When the user selects a next location to visit, visitable items of the image data 37 are displayed, and thus it is possible to induce the user to surely have the same experience as displayed in the image. That is, although the user selects one of items of the image data 37 as a next location to visit, the user is not able to visit its shooting time if its shooting location is too far away. In this regard, user is induced to select from visitable items of the image data 37, and thus the user can visit the shooting location of the selected item of the image data 37 on its shooting time.

After selecting a visiting location from the image list 36, the user can also select an item of the image data 37 as a location to stop by before visiting the visiting location. The user can determine a stop-by location that the user wants to go, which enables the user to decide a location to stop by on the way to the visiting location when the user have enough time before visiting the visiting location.

When the user selects a location to stop by, items of the image data 37 that the user can stop by are displayed, and thus it is possible to induce the user to surely have the same experience as displayed in the image. That is, when the user selects an item of the image data 37 as a stop-by location, the user is not able to visit the location on its shooting time if its shooting location is too far away from the next visiting location. However, the user is induced to select a visitable item of the image data 37, and thus it is possible to enable the user to stop by the shooting location of the selected item of the image data 37 on its shooting time.

[5. Variation]

The present invention is not to be limited to the above described embodiment.

Figure 13:
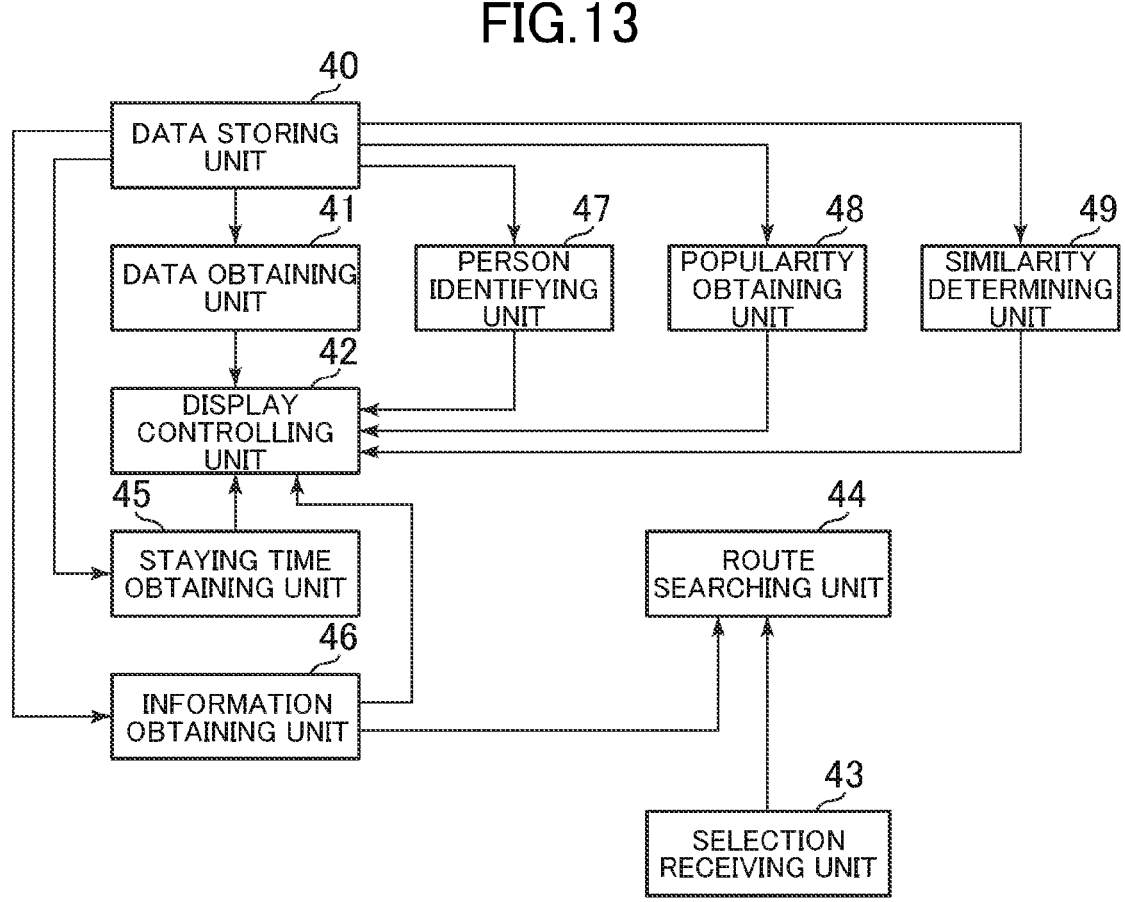
FIG. 13 is a functional block diagram of a variation.

FIG. 13 is a functional block diagram of a variation. As shown in FIG. 13, in this variation, a staying time obtaining unit 45, an information obtaining unit 46, a person identifying unit 47, a popularity obtaining unit 48, and a similarity determining unit 49 are implemented in addition to the functions described in the embodiment. Here, a case will be explained in which these functions are implemented in the route search server 10. These functions are implemented mainly by the control unit 11.

(1) For example, when a user visits a tourist spot or a restaurant, the user may stay in the tourist spot for sightseeing, and stay in the restaurant for meals. In this case, the user would not likely go to a next visiting location until a predetermined staying time has passed since the visiting time, and thus the route search system 1 may execute a route search for the next visiting location in view of a staying time in each visiting location.

FIG. 14 is a diagram showing an example of data stored in an image table of Variation (1). As shown in FIG. 14, the image table stores location attribute information of the image data 37. The location attribute information indicates attributes (category/classification) of locations to which the image data 37 belong. In a case where the image data 37 is photographs or processed photographs, the location attribute information indicates types of shooting locations (or objects). In a case where the image data 37 is CG or scanned drawings, the location attribute information indicates types of what are drawn in CG or drawings. Here, a plurality of attributes are prepared, and at least one attribute is associated with each item of the image data 37. The attributes may be specified by a maker (e.g., photographer of photographs) of the image data 37, or automatically determined by a computer performing image recognition.

The data storing unit 40 in this variation stores a staying time table in which location attribute information and a staying time is associated with each other. FIG. 15 is a diagram showing an example of data stored in the staying time table. As shown in FIG. 15, a staying time is defined for each attribute. A staying time may be a common value for all users, or a different value for each user.

The route search system 1 in this variation includes a staying time obtaining unit 45. The staying time obtaining unit 45 obtains a staying time in a visiting location. For example, the staying time obtaining unit 45 refers to the image table, then obtains location attribute information associated with each item of the image data 37 in the image list 36. Subsequently, the staying time obtaining unit 45 refers to the staying time table, and obtains a staying time associated with the obtained location attribute information.

In the description below, assume a case where the search result data stores information indicating a period of staying time, which is obtained by the obtaining unit 45, after the visiting time determined by the route searching unit 44.

Figure 16:
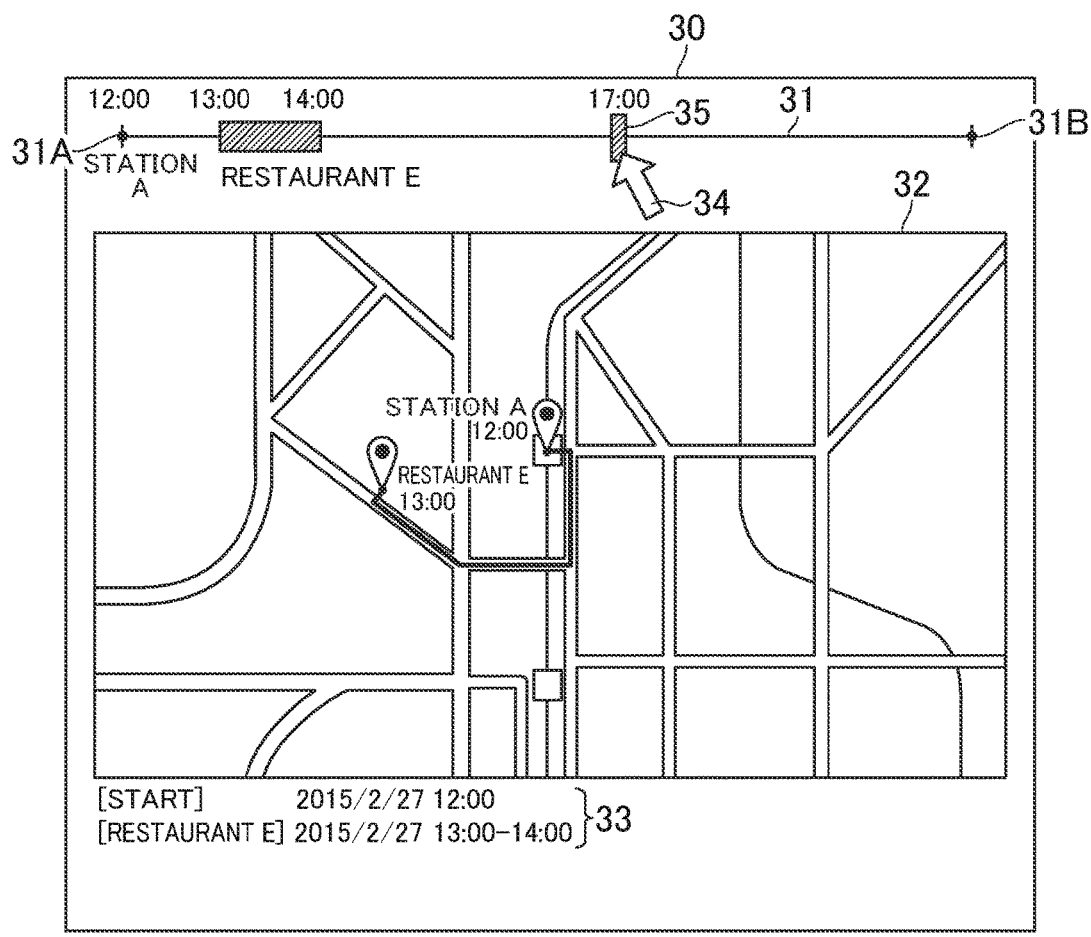
FIG. 16 is a diagram illustrating an example of a route search screen of Variation (1)

The display controlling unit 42 in this variation displays the image data 37 associated with the time information after the staying time has passed since the visiting time on the display unit 25. FIG. 16 is a diagram illustrating an example of the route search screen 30 in Variation (1). In FIG. 16, a case is explained in which a user leaves "Station A" on "Feb. 27, 2015 at 12:00" and visits "Restaurant E" on "Feb. 27, 2015 at 13:00." Here, location attribute information of "Restaurant E" is "restaurant", and a staying time in "restaurant" is "1 hour", and thus the user will stay in "Restaurant E" on "Feb. 27, 2015, from 13:00 to 14:00" as shown in the time axis 31A. In the situation shown in FIG. 16, the user can specify the time before "13:00" or after "14:00" in order to update the route 38. The route search method in a case where the time is specified is the same as described in the embodiment, although in a case where an item of the image data 37 that the user can visit after "Restaurant E" is specified, not "13:00" but "14:00" is a reference.

The display controlling unit 42 may control the movement of the bar 35 not to specify a time zone from "13:00" to "14:00" in the time axis 31, or prevent the image list 36 from being displayed even if the bar 35 moves between "13:00" and "14:00." Alternatively, for example, the display controlling unit 42 may display the image list 36 if the bar 35 moves between "13:00" and "14:00" but prevent the user from selecting the image data 37, or control the route searching unit 44 not to search the route 38 even if the user selects the image data 37.

According to Variation (1), a route search can be executed in view of a staying time at each visiting location, and thus it is possible to prevent an unpractical route search from being executed, such as a case where the user stays in a visiting location but needs to head to the next location right away. In addition, using a staying time associated with the location attribute information enables to execute an accurate route search in accordance with the attribute of the visiting location.

In the above description, the case is explained in which the staying time is associated with the location attribute information, although the staying time may be stored in the image table in association with each item of the image data 37. Alternatively, the staying time may use a common value for items of the image data 37, or be entered by the user on a route selecting screen 30. In a case where the user enters a staying time, the staying time obtaining unit 45 obtains the staying time entered from the operation unit 24, not the staying time stored in the data storing unit 40.

(2) For example, if the user visits a restaurant, the user would likely have a meal there and not likely go to other restaurants before and after the restaurant. In this case, when the user selects a stop-by location or a next visiting location, the image data 37 of restaurants should not be displayed. As such, the route search system 1 may determine an item of the image data 37 to display based on the location attribute information of the item of the image data 37 that has been already selected.

The data storing unit 40 in this variation further stores location attribute information in association with respective items of the image data 37. That is, similarly to Variation (1), the image table stores location attribute information. The data storing unit 40 is described as storing information for identifying the image data 37 selected already.

The display controlling unit 42 prevents an item of the image data 37, which is associated with the location attribute information of the image data item that is selected already, from being displayed. To prevent an item of the image data 37 from being displayed is not to display the item of the image data 37 and to lower a display priority of the item of the image data 37.

For example, the display controlling unit 42 specifies an item of the image data 37 to display in the image list 36 based on a result of comparison between the location attribute information of the item of the image data 37 selected already and location attribute information of another item of the image data 37. The display controlling unit 42 specifies an item of the image data 37 associated with location attribute information other than the location attribute information of the item of the image data 37 selected already (i.e., location attribute information that is different from the location attribute information of the item of the image data 37 selected already) as an item of the image data 37 to display. In other words, the display controlling unit 42 does not display an item of the image data 37 associated with the location attribute information of the item of the image data 37 selected already in the image list 36.

Alternatively, for example, the display controlling unit 42 may determine an item of the image data 37 to display with priority based on a result of comparison between the location attribute information of the item of the image data 37 selected already and location attribute information of another item of the image data 37. "To display with priority" means to have earlier display order in the image list 36 and to highlight an item in the image data 37. "To have earlier display order" means an order in the image list 36 is earlier (e.g., close to the left or the top of the list). "To highlight" means to differentiate a display manner of an item of the image data 37 from other items of the image data 37 by, for example, increasing a size of an image or applying a predetermined effect to an image. The display controlling unit 42 displays an item of the image data 37, which is associated with location attribute information other than the location attribute information of the item of the image data 37 selected already, with priority over an item of the image data 37 associated with the location attribute information of the item of the image data 37 selected already.

According to Variation (2), the display is controlled based on the location attribute information of the item of the image data 37 selected already and the location attribute information of other items of the image data 37, and thus it is possible to provide a user interface capable of assuming and presenting a location that the user wants to visit based on the location attribute information. This enables to prevent the items of the image data 37, which are captured at the location similar to the visiting location determined already, from being repeatedly displayed in the image list 36, and prevent the items of the image data 37 that the user does not want to visit from being displayed, thereby displaying items of the image data 37 that the user wants to visit.

For example, when a restaurant is determined as a visiting location around noon, the image data 37 of a restaurant is not displayed as a visiting location before and after noon, but may be displayed as a visiting location in morning or evening. As such, the display controlling unit 42 may prevent an item of the image data 37 from being displayed when a difference between the time specified by the user in the time axis 31 and the visiting time on the visiting location determined already is within a reference value, and may not prevent the item from being displayed when the difference is equal to or more than the reference value.

For example, there are some locations that the user would not likely visit in succession, and some locations that the user would likely visit in succession. For example, the user would not likely visit visiting locations for the purpose of having meals or staying overnight (e.g., restaurant and hotel) in succession, but would likely visit visiting locations (e.g., shrine and temple) for sightseeing in succession. As such, whether or not to display an item of the image data 37 may be switched in accordance with location attribute information of the item of the image data 37. For example, if the location attribute information of the item of the image data 37 selected already is "restaurant" or "hotel", the display controlling unit 42 prevents the item of the image data 37 of "restaurant" or "hotel" from being displayed, and if the location attribute information of the item of the image data 37 selected already is "shrine" or "temple", the display controlling unit 42 does not prevent the item of the image data 37 from being displayed.

(3) For example, the probability that the user repeatedly visits the same visiting location is low, and thus items of the image data 37 associated with the location information around the location indicated by the location information of the item of the image data 37 selected by the user already may not be displayed in the image list 36.

The display controlling unit 42 prevents a display of an item of the image data 37 associated with the location information that is less than a predetermined distance from the location information of the item of the image data 37 selected already. For example, the display controlling unit 42 may perform the control described above by not displaying, in the image list 36, an item of the image data 37 associated with the location information that is less than a predetermined distance from the location information of the item of the image data 37 selected already, and by displaying, in the image list 36, an item of the image data 37 associated with the location information that is the predetermined distance or more from the location information of the item of the image data 37 selected already.

Further, for example, the display controlling unit 42 may perform the control described above by displaying an item of the image data 37, which is associated with the location information that is a predetermined distance or more from the location information of the item of the image data 37 selected already, with priority over an item of the image data 37 associated with the location information that is less than the predetermined distance from the location information of the item of the image data 37 selected already.

According to Variation (3), it is possible to prevent items of the image data 37 of the same location being repeatedly displayed. This enables the user to easily select an item of the image data 37 that the user wants to visit.

(4) For example, in the embodiment, the case has been explained in which the user specifies the departure point and the departure time, although the user may specify the final visiting location and the final visiting time. That is, the route search system 1 may search a travel route between the departure point and departure time and the final visiting location and visiting time specified by the user.

The route search system 1 of this variation includes an information obtaining unit 46. The information obtaining unit 46 obtains departure point information and departure time information and final visiting location information and final visiting time information based on a detection signal of the operation unit 24. For example, the user terminal 20 may display a screen for receiving the specified departure point and departure time and the specified final visiting location and final visiting time on the display unit 25. In this case, the information obtaining unit 46 obtains the information based on the content entered in the screen.

The departure point information and departure time information and the final visiting location information and final visiting time information may be stored in the data storing unit 40 or a storage unit of an external computer (e.g., database server). In this case, the information obtaining unit 46 obtains the information from the data storing unit 40 or the storage unit of the external computer.

The display controlling unit 42 displays, on the display unit 25, the image data 37 associated with location information according to a route between the departure point indicated by the departure point information and the final visiting location indicated by the final visiting location information, and time information between the departure time indicated by the departure time information and the final visiting time indicated by the final visiting time information. For example, the display controlling unit 42 displays, in the image list 36, items of the image data 37 that the user can visit at the location indicated by the location information on the time indicated by the time information after the user leaves the departure point on the departure time, and, that the user can visit at the final visiting location on the final visiting time after the user leaves the location indicated by the location information on the time indicated by the time information. The method for specifying a visitable item of the image data 37 is the same as described in the embodiment. In this variation, the time that the user can specify in the time axis 31 is within a period of time from the departure time to the final visiting time.

The route searching unit 44 searches a route 38 in which the user leaves the departure point on the departure time, visits the visiting location on the visiting time, and visits final visiting location on the final visiting time. The method of the route search is the same as described in the embodiment.

According to Variation (4), it is possible to search a travel route starting from the departure point specified by the user on the departure time and reaching the final visiting location on the final visiting time. This enables to easily make a plan for a trip, for example, in which a departure and an arrival are determined.

(5) For example, the image data 37 can describe the shooting location more accurately to the user when the image data does not include a person. As such, items of the image data 37 in which a person is not included may be preferentially displayed in the image list 36.

The route search system 1 in this variation includes a person identifying unit 47. The person identifying unit 47 identifies whether a person is captured in each of items of the image data 37. Here, a case is explained in which the image table stores information indicating whether each item of the image data 37 includes a person.

FIG. 17 illustrates an example of data stored in the image table of Variation (5). As shown in FIG. 17, the image table stores person information indicating whether a person is captured. The person information may be specified by a photographer of the image data 37, or automatically determined by a computer performing image recognition.

The display controlling unit 42 prevents an item of the image data 37 including a person from being displayed. For example, the display controlling unit 42 does not specify an item of the image data 37 in which a person is captured as an item of the image data 37 to display, and specifies an item of the image data 37 in which a person is not captured as an item of the image data 37 to display. Further, for example, the display controlling unit 42 may display an item of the image data 37 in which a person is not captured with priority over an item of the image data 37 in which a person is captured.

According to Variation (5), it is possible to accurately describe a shooting location and then execute a route search. As such, the user can be accurately informed of the shooting location before selecting a location to visit.

(6) For example, a popular item of the image data 37 may be preferentially displayed in the image list 36. The route search system 1 of this variation includes a popularity obtaining unit 48. The popularity obtaining unit 48 obtains popularity information of each of items of the image data 37. The popularity information is, for example, the number of items of the image data 37 associated with the same location information, the number of views of the image data 37, and the number of predetermined operations performed by users who have viewed the image data 37 (e.g., the number of times that a button indicating that users like the image data 37 is selected).

FIG. 18 illustrates an example of data stored in the image table of Variation (6). As shown in FIG. 18, popularity information is stored in the image table. Here, numerical values indicating level of popularity of the image data 37 are stored in the popularity information.

For example, when the popularity information indicates the number of items of the image data 37 associated with the same location information, the popularity information is updated each time an item of the image data 37 is recorded. When the popularity information indicates the number of views of an item of the image data 37, the popularity information is updated each time the item of the image data 37 is viewed. When the popularity information indicates the number of predetermined operations performed by users who have viewed the image data 37, the popularity information is updated each time a predetermined operation is received.

The display controlling unit 42 displays items of the image data 37 based on popularity information of each item of the image data 37. For example, the display controlling unit 42 does not specify an item of the image data 37 having popularity information that is less than a reference value as an item of the image data 37 to display, and specifies an item of the image data 37 having popularity information that is a reference value or more as an item of the image data 37 to display. Further, for example, the display controlling unit 42 may preferentially display an item of the image data 37 having a higher value of popularity information.

According to Variation (6), a popular item of the image data 37 is easily presented to the user by controlling a display of items of the image data 37 based on the popularity information. As such, it is possible to present an attractive item of the image data 37 for the user to select.

(7) For example, if there are a lot of similar items of the image data 37 and the image list 36 includes only those similar items, the user is unable to select a location that they want to visit. As such, when there are some similar items of the image data 37 in the image table, only one of them may be displayed.

The route search system 1 of this variation includes a similarity determining unit. The similarity determining unit determines whether a plurality of items of the image data 37 are similar to one another. "A plurality of items of the image data 37 are similar to one another" means that images are similar to one another and associated with the same location information. In a case where the image data 37 is registered in a word-of-mouth information site, for example, similar content (e.g., word-of-mouth information) posted by users may corresponds to similar image data 37. The content posted by users means content entered by users, for example, similar character strings posted by users.

FIG. 19 illustrates an example of data stored in the image table of Variation (7). As shown in FIG. 19, the image table stores similarity information for identifying similar items of the image data 37. In the example of data storage shown in FIG. 19, items of the image data 37 having the same similarity information are similar to each other.

The display controlling unit 42 restricts a display of similar items of the image data 37. For example, the display controlling unit 42 specifies a part (e.g., only one) of similar items of the image data 37 as the image data 37 to display. Further, for example, the display controlling unit 42 may display an item of the image data 37, which is not similar to the specified item of the image data 37 to display, with priority over a similar item of the image data 37.

According to Variation (7), it is possible to restrict only the display of the similar items of the image data 37. As such, the user can select a location to visit from the image list 36 in which a variety of items of the image data 37 are displayed.

(8) In the above, the case is explained in which the user specifies the departure time and the departure point, for example, although the user may not specify the departure time and the departure point. For example, the current date and time and the current position obtained by the control unit 21 of the user terminal 20 may be the departure point and the departure time, respectively. In this regard, the current position may be obtained from a communication result of the communication unit 23, or obtained from a signal received by a GPS sensor, which is installed in the user terminal 20, from a satellite.

For example, the departure time and the departure point may be determined by calculating the first visiting time and the first visiting location backwards. In this case, the route searching unit 44 determines, among from predetermined locations (e.g., station and bus stop), a location that is closest to the first visiting location as a departure point. Then route searching unit 44 then calculates a departure time for the user to arrive the first visiting location on its visiting time.

For example, a time indicated by the time information may be a time other than a shooting time. For example, the user may input a recommended time zone to visit the shooting location of the image data 37.

Further, for example, information displayed on the route search screen 30 is not limited to those described in the embodiment and the variations. For example, in addition to the image list 36, the display controlling unit 42 may display information relating to shooting locations of the image data 37 on the route search screen 30. The information relating to the shooting locations includes, for example, character strings indicating place names and business hours (opening time in a case of theater or movie theater) of the shooting locations. Such information is described as being stored in the data storing unit 40.

For example, on the route search screen 30, the user may specify location attribute information of an item of the image data 37 that the user wants to display in the image list 36. For example, the user may specify location attribute information of "restaurant" and display only the image data 37 of "restaurant", or specify location attribute information of "hotel" and display only the image data 37 of "hotel." In this case, the display controlling unit 42 displays a plurality of items of location attribute information selectably on the route search screen 30, and specifies an item of the image data 37 associated with the location attribute information selected by the user as an item of the image data 37 to display. Alternatively, the display controlling unit 42 may display an item of the image data 37 associated with the location attribute information selected by the user with priority over an item of the image data 37 associated with other location attribute information.

For example, the route search system 1 may omit functions other than the data obtaining unit 41, the display controlling unit 42, the selection receiving unit 43, and the route searching unit 44. When an item of the image data 37 posted on a social networking service is used, for example, the data storing unit 40 may be implemented in an external system (i.e., system of social networking service). In this case, the data obtaining unit 41 obtains an item of the image data 37 from the external system, for example. Further, the display controlling unit 42 may display, in the in the image list 36, only items of the image data 37 that are posted earlier in time.

Although a case has been explained in which each function is implemented in the route search server 10, functions may be shared between the route search server 10 and the user terminal 20, or may be implemented in the user terminal 20. In a case where the functions are implemented in the user terminal 20, an application including a route search algorithm is stored in the storage unit 22. The user terminal 20 implements the functions by activating the application.

For example, in a case where the data obtaining unit 41 is implemented in the user terminal 20, the data obtaining unit 41 is implemented mainly by the control unit 21. In this case, the data obtaining unit 41 obtains the image data 37, for example, from the route search server 10 or the external system via the network 2. Further, for example, in a case where the display controlling unit 42 is implemented in the user terminal 20, the display controlling unit 42 is implemented mainly by the control unit 21 and the display unit 25. The display controlling unit 42 may display the route search screen 30 based on the display data received from the route search server 10, or generate and display the display data of the route search screen 30 based on the received image data 37, for example.

In a case where the selection receiving unit 43 is implemented in the user terminal 20, the selection receiving unit 43 is implemented mainly by the control unit 21 and the operation unit 24. The selection receiving unit 43 receives a selection of the image data 37 by a signal from the operation unit 24. In a case where the route searching unit 44 is implemented in the user terminal 20, the route searching unit 44 is implemented mainly by the control unit 21. In this case, an algorithm of a route search is stored in the storage unit 22, for example, and the route searching unit 44 executes the route search based on the algorithm.

The invention claimed is:

1. A route search system comprising:
  a storage that stores images respectively in association with location information and time information; and
  at least one processor configured to:
    search first images from among the images based on a location and time which are designated by a user;
    cause a display to display the searched first images, wherein each of the searched first images has already been associated with the location information and the time information before displaying;
    receive a selection of any one of the displayed first images, wherein the selected first image has already been associated with the location information and the time information before displaying;

determine a first visiting location based on location information of the selected first image;

determine a first visiting time based on time information of the selected first image;

search a route for visiting the first visiting location on the first visiting time;

search second images from among the images based on the first visiting location and the first visiting time, the second images being different from the first images;

cause the display to newly display the searched second images, wherein each of the searched second images has already been associated with the location information and the time information before displaying;

receive a selection of any one of the displayed second images, wherein the selected second image has already been associated with the location information and the time information before displaying;

determine a second visiting location based on location information of the selected second image;

determine a second visiting time based on time information of the selected second image; and search the route again so that the second visiting location is visited at the second visiting time.

2. The route search system according to claim 1, wherein the at least one processor causes the display to display a plurality of items of image data associated with the time information that is later than the first visiting time by the second display process, wherein the second location is a next location of the first location, wherein the second visiting location is a next visiting location of the first visiting location, and wherein the second visiting time is a next visiting time of the first visiting time.

3. The route search system according to claim 2, wherein the at least one processor:

obtains a staying time in the first visiting location; and causes the display to display a plurality of items of image data, associated with the time information after a period of the staying time has passed since the first visiting time by the second display process.

4. The route search system according to claim 2, wherein the at least one processor causes the display to display a plurality of items of image data of a visitable location indicated by the location information on a time indicated by the time information after the first visiting location is visited on the first visiting time.

5. The route search system according to claim 1, wherein the second images respectively indicate a visitable place before the first visiting time, wherein the second visiting location is a stop-by location before the first visiting location, and wherein the second visiting time is a stop-by time before the first visiting time.

6. The route search system according to claim 5, wherein the at least one processor causes the display to display a plurality of items of the image data of a visitable location indicated by the location information and on a time indicated by the time information so that the first visiting location is visited on the first visiting time by the second display process.

7. The route search system according to claim 1, wherein the storage further stores location attribute information in association with each item of the image data, and wherein the at least one processor prevents a display of an item of the image data associated with the location attribute information of the first image data that is already selected.

8. The route search system according to claim 1, wherein the at least one processor prevents a display of image data associated with location information that is less than a predetermined distance from the location information of the first image data that is already selected.

9. The route search system according to claim 1, wherein the at least one processor:

obtains departure point information, departure time information, final visiting location information, and final visiting time information;

causes the display to display a plurality of items of image data associated with location information according to a route between a departure point indicated by the departure point information and a final visiting location indicated by the final visiting, location information, and time information between a departure time indicated by the departure time information and a final visiting time indicated by the final visiting time information by the first display process and the second display process; and searches a route for leaving the departure point on the departure time, visiting the first visiting location and the second visiting location respectively on the first visiting time and second visiting time, and visiting the final visiting location on the final visiting time.

10. The route search system according to claim 1, wherein the at least one processor:

determines whether a person is captured in each item of the image data; and prevents an item of the image data, in which a person is captured, from being displayed.

11. The route search system according to claim 1, wherein the at least one processor:

obtains popularity information of each item of the image data; and displays image data based on the popularity information of each item of the image data by the first display process and the second display process.

12. The route search system according to claim 1, wherein the at least one processor:

determines whether the items of image data are similar to one another; and prevents the similar items of image data from being displayed.

13. A route search device comprising:

storage that stores images respectively in association With location and time information; and at least one processor configured to:

search first images from among the images based on a location and time which are designated by a user;

cause a display to display the searched first images, wherein each of the searched first images has already been associated with the location information and the time information before displaying;

receive a selection of any one of the displayed first images, wherein the selected first image has already been associated with the location information and the time information before displaying;

determine a first visiting location based on location information of the selected first image;

determine a first visiting time based on time information of the selected first image;

search a route for visiting the first visiting location on the first visiting time;
search second images from among the images based on the first visiting location and the first visiting time, the second images being different from the first images;
cause the display to newly display of the searched second images, wherein each of the searched second images has already been associated with the location information and the time information before displaying;
receive a selection of any one of the displayed second images, wherein the selected second image has already been associated with the location information and the time information before displaying;
determine a second visiting location based on location information of the selected second image;
determine a second visiting time based on time information of the selected second image;
search the route again so that the second visiting location is visited at the second visiting time.

14. A route search method comprising:
obtaining content stored storage that stores images respectively in association with location information and time information;
searching first images from among the images based on a location and time which are designated by a user;
causing a display to display the searched first images, wherein each of the searched first images has already been associated with the location information and the time information before displaying;
receiving a selection of any one of the displayed first images, wherein the selected first image has already been associated with the location information and the time information before displaying;
determining a first visiting location based on location information of the selected first image;
determining a first visiting time based on time information of the selected first image;
searching a route for visiting the first visiting location on the first visiting time;
searching second images from among the images based on the first visiting location and the first visiting time, the second images being different from the first images;
causing the display to newly display the searched second images, wherein each of the searched second images has already been associated with the location information and the time information before displaying;
receiving a selection of any one of the displayed second images, wherein the selected second image has already been associated with the location information and the time information before displaying;
determining a second visiting location based on location information of the selected second image;
determining a second visiting time based on time information of the selected second image data; and
searching the route again so that the second visiting location is visited at the second visiting time.

15. A non-transitory computer-readable information storage medium for storing a program for causing a computer to:
obtain content stored in a storage that stores images respectively in association with location information and time information;
search first images from among the images based on a location and time which are designated by a user;
cause a display to display the searched first images, wherein each of the searched first images has already been associated with the location information and the time information before displaying;
receive a selection of any one of the displayed first images, wherein the selected first image has already been associated with the location information and the time information before displaying;
determine a first visiting location based on location information of the selected first image;
determine a first visiting time based on time information of the selected first image;
search a route for visiting the visiting first location on the first visiting time;
search second images from among the images based on the first visiting location and the first visiting time, the second images being different from the first images;
cause the display to newly display the searched second images, wherein each of the searched second images has already been associated with the location information and the time information before displaying;
receive a selection of any one of the displayed second images, wherein the selected first image has already been associated with the location information and the time information before displaying;
determine a second visiting location based on location information of the selected second image;
determine a second visiting time based on time information of the selected second image;
search the route again so that the second visiting location is visited at the second visiting time.

* * * * *